United States Patent
Prince

(10) Patent No.: US 10,073,002 B2
(45) Date of Patent: Sep. 11, 2018

(54) FLUTTER DETECTION SENSOR

(71) Applicant: United Technologies Corporation, Hartford, CT (US)

(72) Inventor: Troy Shannon Prince, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 313 days.

(21) Appl. No.: 15/060,297

(22) Filed: Mar. 3, 2016

(65) Prior Publication Data

US 2017/0254723 A1     Sep. 7, 2017

(51) Int. Cl.
    *G01M 9/06*     (2006.01)
    *G01M 15/14*     (2006.01)
    *F01D 25/04*     (2006.01)

(52) U.S. Cl.
    CPC ............... *G01M 9/06* (2013.01); *F01D 25/04* (2013.01); *G01M 15/14* (2013.01); *F05D 2260/96* (2013.01)

(58) Field of Classification Search
    CPC ......... G01M 9/06; G01M 15/14; F01D 25/04; F05D 2260/96
See application file for complete search history.

(56) References Cited

U.S. PATENT DOCUMENTS

| | | | | |
|---|---|---|---|---|
| 6,010,303 A * | 1/2000 | Feulner | ................... | F04D 27/02 415/118 |
| 6,195,982 B1* | 3/2001 | Gysling | ................ | F04D 29/668 415/119 |
| 2003/0077163 A1* | 4/2003 | Eveker | ................ | F04D 27/0207 415/1 |
| 2010/0219987 A1* | 9/2010 | Isom | ..................... | G07C 5/0816 340/946 |
| 2012/0137759 A1* | 6/2012 | Krok | ..................... | F04D 27/008 73/112.05 |

FOREIGN PATENT DOCUMENTS

| EP | 1016792 | 7/2000 |
|---|---|---|
| EP | 1967701 | 9/2008 |

OTHER PUBLICATIONS

EP Search Report dated Nov. 8, 2017 in EP Application No. 17158485.7.
European Patent Office, European Office Action dated Jul. 12, 2018 in Application No. 17158485.7-1006.

* cited by examiner

Primary Examiner — David Bolduc
(74) Attorney, Agent, or Firm — Snell & Wilmer L.L.P.

(57) ABSTRACT

Systems and methods for monitoring aerostructures are provided. In various embodiments, a method for monitoring an aerostructure may include: receiving a signal from a pressure sensor, the pressure sensor located downstream from the aerostructure; performing a time frequency analysis on the signal to calculate a power level over a range of frequencies; monitoring the power level over the range of frequencies; and determining a susceptibility to a flutter condition based on the monitoring the power level.

19 Claims, 7 Drawing Sheets

FLUTTER DETECTION SENSOR

FIELD

The present disclosure relates to gas turbine engines, and, more specifically, to airfoils such as fan blades for gas turbine engines.

BACKGROUND

Flutter is a phenomenon encountered in flexible structures subjected to aerodynamic forces. Flutter may occur as a result of interactions between aerodynamics, stiffness, and inertial forces on a structure. In regards to a gas turbine engine, as the speed of inlet air across a fan blade, for example, increases, there may be a point at which the structural damping is insufficient to damp out the vibrational frequencies which may increase due to aerodynamic energy being added to the fan blade.

SUMMARY

Systems and methods are provided herein. A method for monitoring an aerostructure may comprise: receiving, by a controller, a signal from a pressure sensor, the pressure sensor located downstream from the aerostructure; performing, by the controller, a time frequency analysis on the signal to calculate a power level over a range of frequencies; monitoring, by the controller, the power level over the range of frequencies; and determining a susceptibility to a flutter condition based on the monitoring the power level.

In various embodiments, the pressure sensor may be capable of measuring a dynamic frequency with a Nyquist frequency greater than at least a third fundamental frequency of the aerostructure. The performing the time frequency analysis may include at least one of performing a Fourier transform, a wavelet transform, a bilinear time frequency distribution, or a modified Wigner distribution function. The monitoring the power level may include determining a shift in the power level from a lower frequency to a higher frequency. The monitoring the power level may include calculating a change in the power level over the range of frequencies. The monitoring the power level may include calculating a change in the power level at a pre-determined frequency. The determining the susceptibility to the flutter condition may be based on the power level over the range of frequencies. The determining the susceptibility to the flutter condition may include determining if the power level is above a threshold value. The determining the susceptibility to the flutter condition may include determining a shift in the power level from a lower frequency to a higher frequency.

A method for monitoring an aerostructure, may comprise: receiving, by a controller, a signal from a pressure sensor, the pressure sensor located downstream from the aerostructure; calculating, by the controller, a first bandpass signal based on the signal; calculating, by the controller, a second bandpass signal based on the signal, the second bandpass signal comprising a higher frequency than the first bandpass signal; performing, by the controller, a time frequency analysis on the first bandpass signal and the second bandpass signal to calculate a first power level of the first bandpass signal and a second power level of the second bandpass signal; and determining, by the controller, a change in at least one of a magnitude of the first power level and a magnitude of the second power level.

In various embodiments, the method may further comprise, determining, by the controller, a susceptibility to a flutter condition based on the monitoring. The method may further comprise, outputting, by the controller, an indicating signal based on the determining the susceptibility, the indicating signal indicating the susceptibility. The pressure sensor may be capable of measuring a dynamic frequency with a Nyquist frequency greater than at least a third fundamental frequency of the aerostructure. The performing the time frequency analysis may include at least one of performing a Fourier transform, a wavelet transform, a bilinear time frequency distribution, or a modified Wigner distribution function. The determining the change may include determining a shift in the magnitude of the first power level to the magnitude of the second power level.

A system for monitoring an aerostructure may comprise: a pressure sensor configured to be located downstream from an aerostructure; a controller in electronic communication with the pressure sensor; and a tangible, non-transitory memory configured to communicate with the controller, the tangible, non-transitory memory having instructions stored thereon that, in response to execution by the controller, cause the controller to perform operations comprising: receiving, by the controller, a signal from the pressure sensor; performing, by the controller, a time frequency analysis on the signal to calculate an power level over a range of frequencies; monitoring, by the controller, the power level over the range of frequencies; and outputting an indicating signal based on the power level.

In various embodiments, the indicating signal may indicate a susceptibility to a flutter condition of the aerostructure. The instructions may cause the controller to perform operations further comprising: calculating a first bandpass signal based on the signal; calculating a second bandpass signal based on the signal, the second bandpass signal comprising a higher frequency than the first bandpass signal; performing the time frequency analysis on the first bandpass signal and the second bandpass signal to calculate a first power level of the first bandpass signal and a second power level of the second bandpass signal; and determining a change in at least one of a magnitude of the first power level and a magnitude of the second power level. The pressure sensor may be capable of measuring a dynamic frequency with a Nyquist frequency greater than at least a third fundamental frequency of the aerostructure. The pressure sensor may be configured to be coupled to at least one of an inner fixed structure or a fan case.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
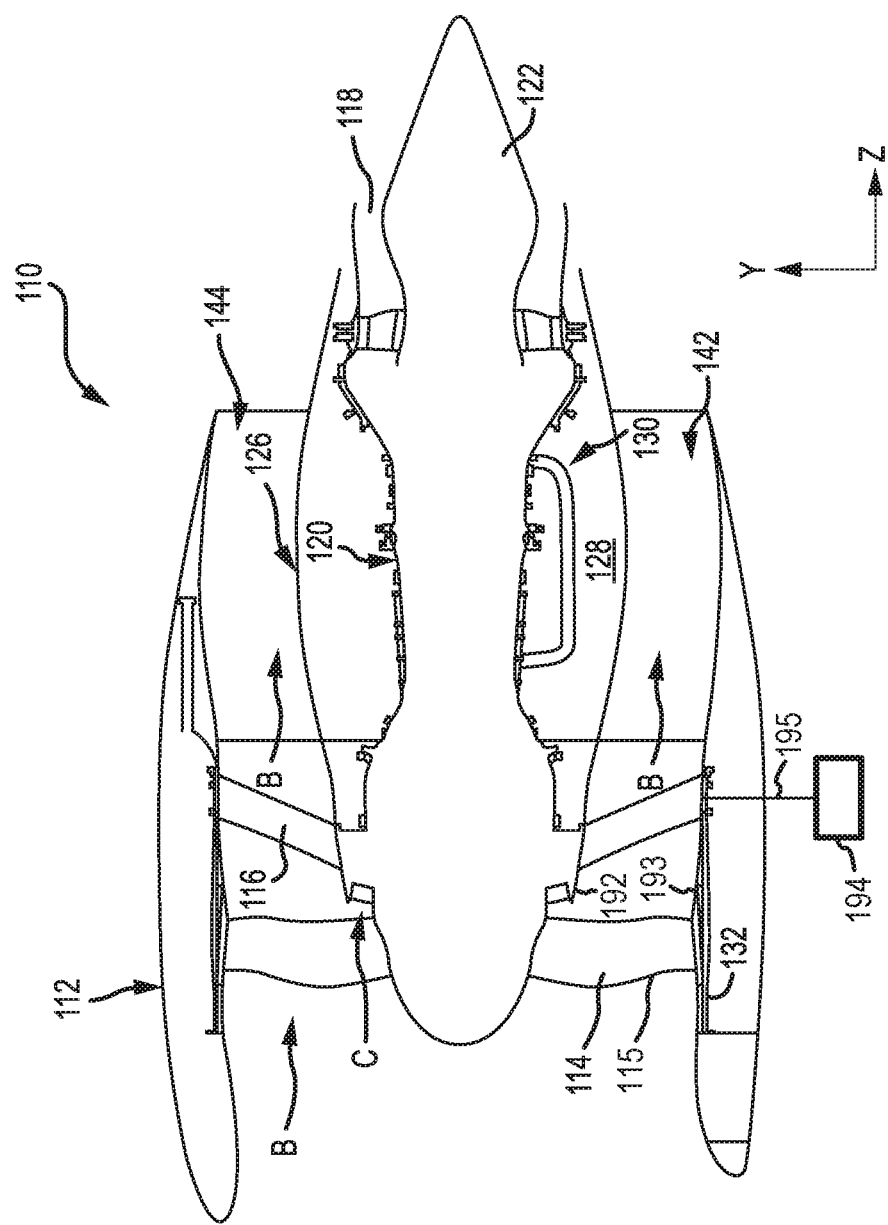
FIG. 1 illustrates a cross-sectional view of an exemplary gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "gas" and "air" may be used interchangeably.

Flutter is a phenomenon encountered in flexible structures subjected to aerodynamic forces. Flutter may occur as a result of interactions between aerodynamics, stiffness, and inertial forces on a structure. In regards to an aircraft, as the speed of the air across the aircraft increases, there may be a point at which the structural damping is insufficient to damp out the vibrational frequencies, which may increase, due to aerodynamic energy being added to the structure. In regards to a gas turbine engine, as the speed of bypass air across a fan blade mounted to a nacelle, for example, increases, there may be a point at which the structural damping is insufficient to damp out the vibrational frequencies, which may increase, due to aerodynamic energy being added to the fan blade. These vibrations may cause high-cycle fatigue or other failures.

A pressure sensor, or in various embodiments, an array of pressure sensors, may be located in the downstream vicinity of a fan blade in the nacelle. The pressure sensor may be a high speed pressure sensor. The pressure sensor may be capable of measuring dynamic frequencies with a Nyquist frequency beyond at least the third fundamental fan blade passage frequency. As an airfoil, such as the fan blade for example, starts to approach a flutter condition, the pressure signals may experience both an increase of overall energy as well as a shift in energy into different frequency bands. These frequency shifts may be measured and captured to estimate a flutter condition or flutter susceptibility condition for the fan at a given point in time. The susceptibility of a flutter condition may be a probability of a flutter condition occurring. The susceptibility of a flutter condition may be based off of historical data. Sudden shifts of power from low to high frequencies of aerostructures may indicate a flutter condition. Thus, as power starts to shift from a low frequency to a high frequency, an aerostructure may be susceptible to a flutter condition. In various embodiments, susceptibility may be calculated as a percentage between zero percent and one hundred percent. In various embodiments, susceptibility of a flutter condition may be a Boolean operator. An engine operating condition may be changed in response to the frequency shifts in order to mitigate vibration and noise.

In various embodiments, the pressure sensor may be evaluated using time-frequency analysis (i.e., Fourier transform, bilateral Wigner, wavelet transform, etc.) to identify changes in overall spectrum.

In various embodiments, a banked set of filters may be used to isolate the signal into specific segments of interest. For example, a banked set of filters may divide pressure signals into low, medium, and high frequency signals. In various embodiments, the banked set of filters may divide pressure signals into various frequency ranges. Such filtered frequency ranges may be used to calculate continuous power for each filtered frequency range.

A logic system may be used to evaluate the processed input signals to determine an estimate of the flutter state of the fan system. In various embodiments, an expert system may be used to determine the flutter state. In various embodiments, a banked fuzzy logic system may be used to estimate the susceptibility of a flutter condition.

Such systems may provide a signal (also referred to herein as an indication signal) indicating that a fan is about to reach a flutter condition to allow active systems to be used to minimize flutter risk. Such systems may provide an indication signal to allow active systems to command the engine into a different operating regime to attenuate the flutter state. Such systems may also provide information that could be used to adjust life parameters for fan blades.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

FIG. 1 illustrates a schematic view of a gas turbine engine, in accordance with various embodiments. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Figure 2:
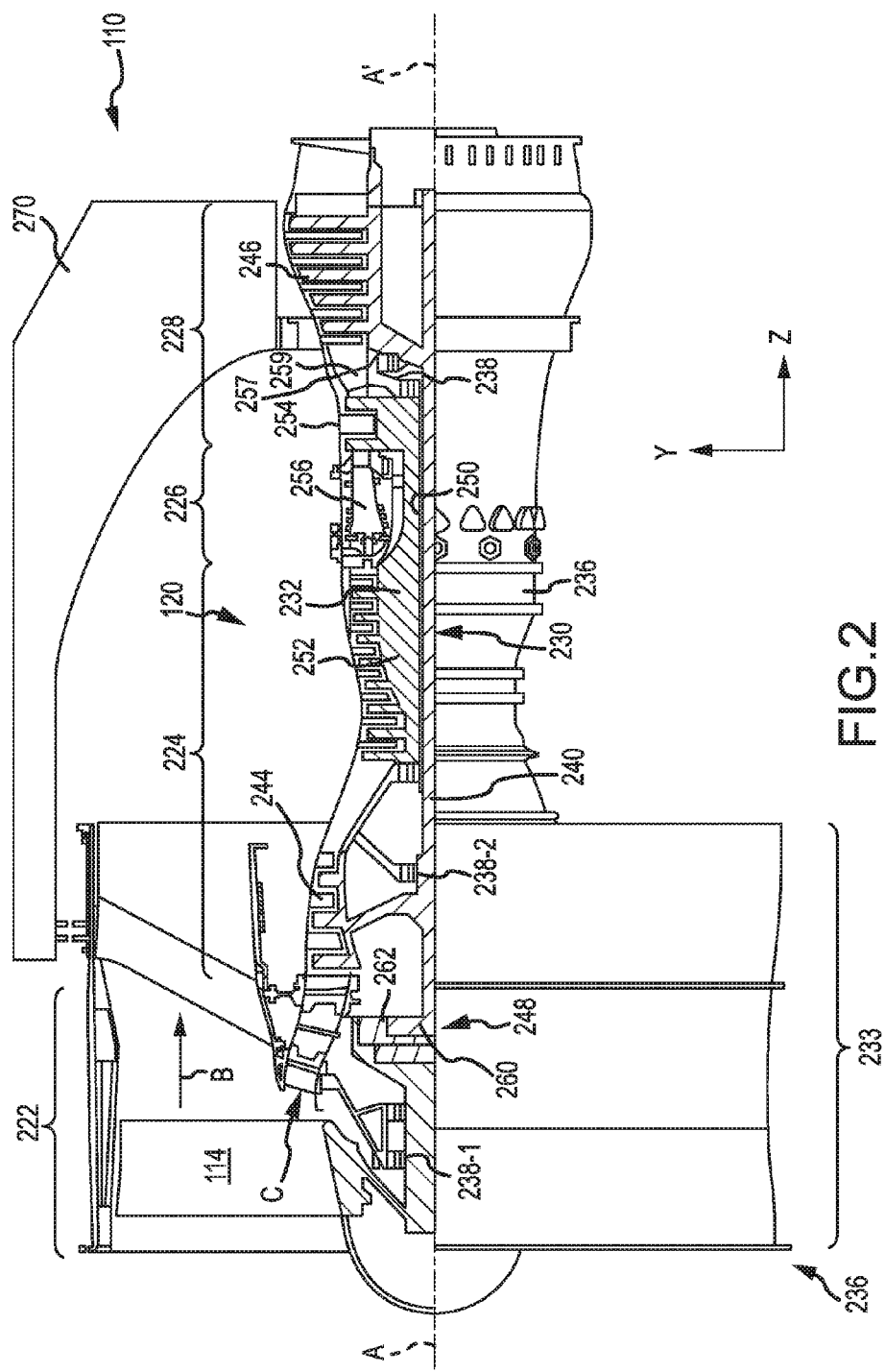
FIG. 2 illustrates a cross-sectional view of an exemplary gas turbine engine mounted to a pylon, in accordance with various embodiments.

With momentary reference to FIG. 2, nacelle 112 typically comprises two halves which are typically mounted to pylon 270. Fan case structure 233 may provide structure for securing gas turbine engine 110 to pylon 270. According to various embodiments, multiple guide vanes 116 may extend radially between core engine 120 and fan case 132.

Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or a compressed air duct 130, for example. Compressed air duct 130 may be under high pressure and may supply compressed cooling air from a compressor stage to a high pressure turbine stage, for example. In various embodiments, a heat exchanger may be coupled to compressed air duct 130.

In various embodiments, one or more pressure sensors may be located downstream (i.e., aft) from an aerostructure. In various embodiments, a single pressure sensor may be located downstream from the fan 114. Fan 114 may comprise one or more fan blades, such as fan blade 115. The pressure sensor may be located proximate the fan blade. Pressure sensor 192 is illustrated as being coupled to IFS 126 downstream from fan blade 115. Pressure sensor 193 is illustrated as being coupled to fan case 132 downstream from fan blade 115. Pressure sensor 193 may be similar to pressure sensor 192. Pressure sensor 192 and pressure sensor 193 may be high speed pressure sensors. Pressure sensor 192 and pressure sensor 193 may be capable of measuring a dynamic frequency with a Nyquist frequency greater than at least a third fundamental frequency of fan 114. In various embodiments, the fundamental frequency of fan 114 may be proportional to an angular velocity of fan 114.

In various embodiments, an array of pressure sensors may be disposed circumferentially about a center axis of a fan blade and located downstream from the fan blade. The array of pressure sensors may be capable of detecting asymmetric flow across a fan blade, for example, during a maneuver operation of an aircraft or in the case of non-laminar air flow.

In various embodiments, pressure sensor 192 and/or pressure sensor 193 may be electronically coupled to a controller 194. In various embodiments, pressure sensor 192 and/or pressure sensor 193 may be electronically coupled to a controller 194 via a wire 195. In various embodiments, pressure sensor 192 and/or pressure sensor 193 may be electronically coupled to a controller 194 via a wireless communication, such as a wireless local area computer network or any other means of wireless communication. Controller 194 may have instructions stored thereon that cause controller 194 to perform operations as described herein.

In various embodiments, pressure sensor 192 and controller 194 may comprise a system for monitoring an aerostructure (i.e., fan 114).

With respect to FIG. 2, elements with like element numbering as depicted in FIG. 1 are intended to be the same and will not necessarily be repeated for the sake of clarity.

In various embodiments and with reference to FIG. 2, a gas turbine engine 110 is provided. Gas turbine engine 110 may be a two-spool turbofan that generally incorporates a fan section 222, a compressor section 224, a combustor section 226 and a turbine section 228. Alternative engines may include, for example, an augmentor section among other systems or features. In operation, fan section 222 can drive air along a bypass flow-path B while compressor section 224 can drive air along a core flow-path C for compression and communication into combustor section 226 then expansion through turbine section 228. Although depicted as a turbofan gas turbine engine 110 herein, it should be understood that the concepts described herein are not limited to use with turbofans as the teachings may be applied to other types of turbine engines including three-spool architectures.

Gas turbine engine 110 may generally comprise a low speed spool 230 and a high speed spool 232 mounted for rotation about an engine central longitudinal axis A-A' relative to an engine static structure 236 via one or more bearing systems 238 (shown as bearing system 238-1 and bearing system 238-2 in FIG. 2). It should be understood that various bearing systems 238 at various locations may alternatively or additionally be provided including, for example, bearing system 238, bearing system 238-1, and bearing system 238-2.

Low speed spool 230 may generally comprise an inner shaft 240 that interconnects a fan 114, a low pressure (or first) compressor section 244 and a low pressure (or first) turbine section 246. Inner shaft 240 may be connected to fan 114 through a geared architecture 248 that can drive fan 114 at a lower speed than low speed spool 230. Geared architecture 248 may comprise a gear assembly 260 enclosed within a gear housing 262. Gear assembly 260 couples inner shaft 240 to a rotating fan structure. High speed spool 232 may comprise an outer shaft 250 that interconnects a high-pressure compressor ("HPC") 252 (e.g., a second compressor section) and high pressure (or second) turbine section 254. A combustor 256 may be located between HPC 252 and high pressure turbine 254. A mid-turbine frame 257 of engine static structure 236 may be located generally between high pressure turbine 254 and low pressure turbine 246. Mid-turbine frame 257 may support one or more bearing systems 238 in turbine section 228. Inner shaft 240 and outer shaft 250 may be concentric and rotate via bearing systems 238 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 244 then HPC 252, mixed and burned with fuel in combustor 256, then expanded over high pressure turbine 254 and low pressure turbine 246. Mid-turbine frame 257 includes airfoils 259 which are in the core airflow path. Low pressure turbine 246 and high pressure turbine 254 rotationally drive the respective low speed spool 230 and high speed spool 232 in response to the expansion.

Gas turbine engine 110 may be, for example, a high-bypass geared aircraft engine. In various embodiments, the bypass ratio of gas turbine engine 110 may be greater than about six (6). In various embodiments, the bypass ratio of gas turbine engine 110 may be greater than ten (10). In various embodiments, geared architecture 248 may be an epicyclic gear train, such as a star gear system (sun gear in meshing engagement with a plurality of star gears supported by a carrier and in meshing engagement with a ring gear) or other gear system. Geared architecture 248 may have a gear reduction ratio of greater than about 2.3 and low pressure turbine 246 may have a pressure ratio that is greater than about 5. In various embodiments, the bypass ratio of gas turbine engine 110 is greater than about ten (10:1). In various embodiments, the diameter of fan 114 may be significantly larger than that of the low pressure compressor 244, and the low pressure turbine 246 may have a pressure ratio that is greater than about 5:1. Low pressure turbine 246 pressure ratio may be measured prior to inlet of low pressure turbine 246 as related to the pressure at the outlet of low pressure turbine 246 prior to an exhaust nozzle. It should be understood, however, that the above parameters are exemplary of various embodiments of a suitable geared architecture engine and that the present disclosure contemplates other gas turbine engines including direct drive turbofans. FIG. 1 and FIG. 2 provide a general understanding of the sections in a gas turbine engine, and is not intended to limit the disclosure. The present disclosure may extend to all types of turbine engines, including turbofan gas turbine engines and turbojet engines, for all types of applications.

Figure 3:
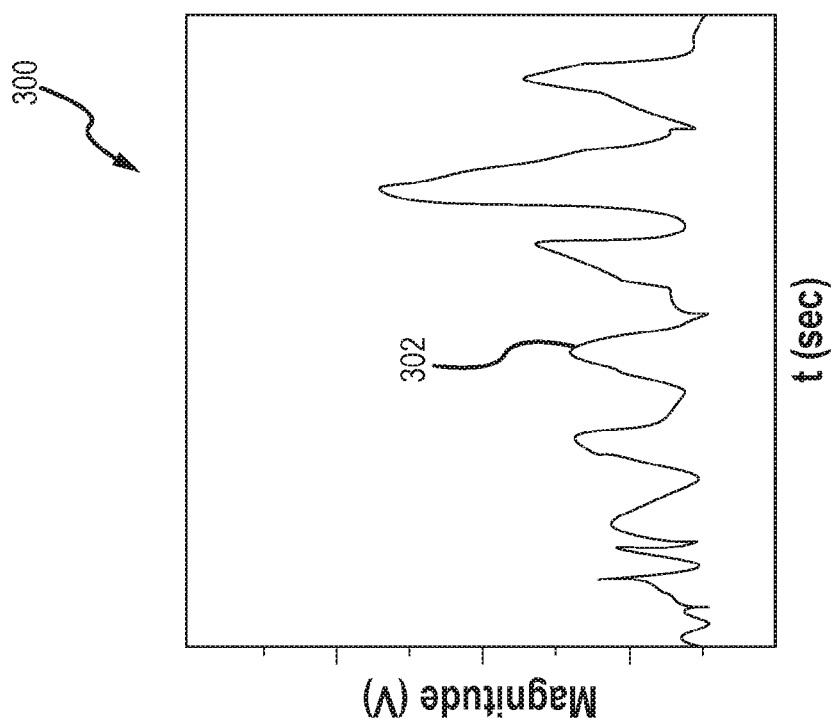
FIG. 3 illustrates a plot of a signal from a pressure sensor, in accordance with various embodiments.

With reference to FIG. 3, a plot 300 of a signal 302 is illustrated, in accordance with various embodiments. Signal 302 may be a signal indicative of a pressure as measured by pressure sensor 192 (see FIG. 1). In various embodiments, signal 302 is measured in volts (V), as illustrated in FIG. 3. In various embodiments, signal 302 may be measured in amperage (A). In various embodiments, signal 302 may be measured in Pascals (Pa), or any other suitable units of pressure. Although signal 302 is measured in volts, signal 302 may represent a pressure. In various embodiments, an equation may be used to convert volts to units of pressure, such as Pascals, for example. Signal 302 may be a time varying signal. Thus, signal 302 may be measured over time. A time frequency analysis of signal 302 may be performed. In various embodiments, a time frequency analysis of signal 302 may be performed to calculate power as a function of frequency.

Figures 4A, 4B:
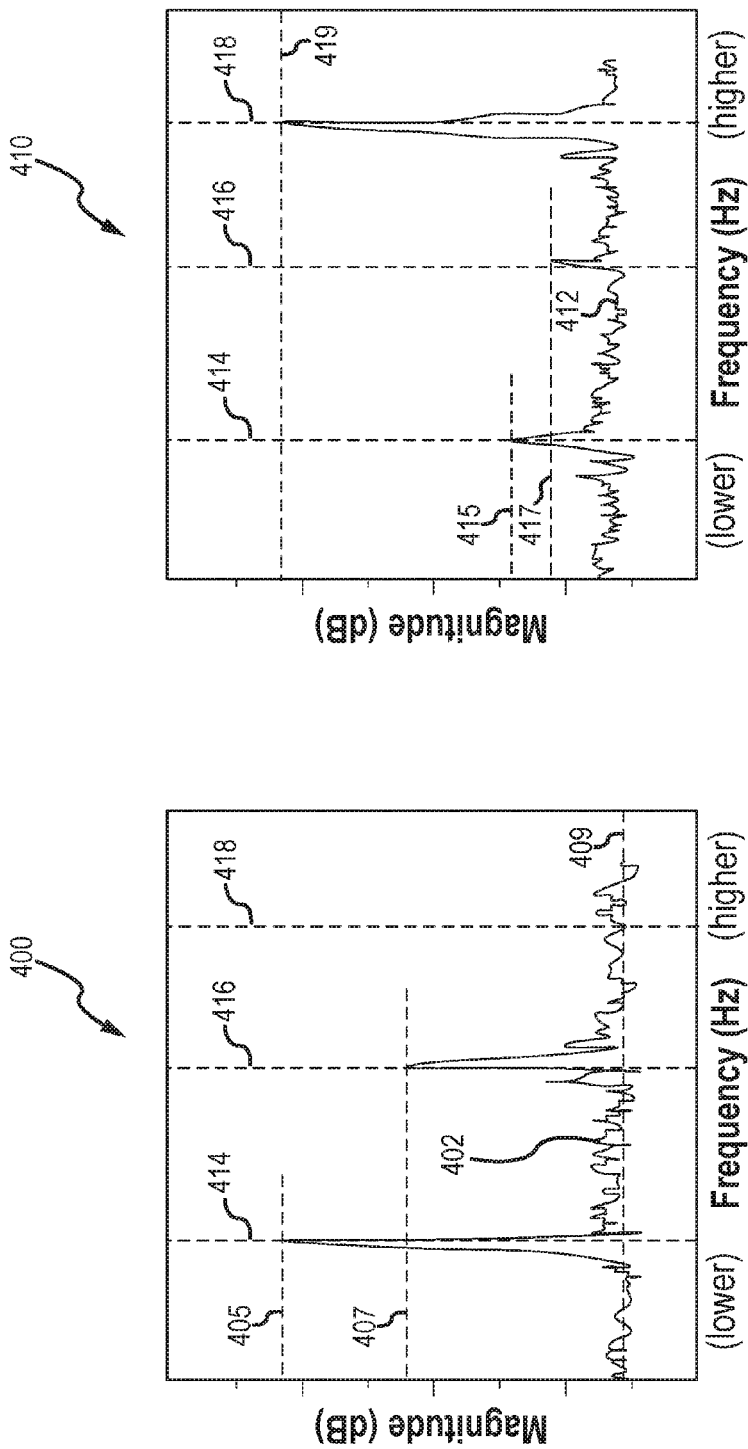
FIG. 4A illustrates a plot of power in decibels (dB) versus frequency in hertz (Hz), in accordance with various embodiments.
FIG. 4B illustrates a plot of power in decibels (dB) versus frequency in hertz (Hz) with a shift in magnitude of a power level from a lower frequency to a higher frequency as compared to FIG. 4A, in accordance with various embodiments.

With reference to FIG. 4A, a plot 400 of power in decibels (dB) versus frequency in hertz (Hz) is illustrated, in accordance with various embodiments. Signal 402 may represent a signal produced by signal 302 (see FIG. 3) via a time frequency analysis. A time frequency analysis may include a Fourier transform, a wavelet transform, a bilinear time frequency distribution, a modified Wigner distribution function, or the like. Although illustrated in units of decibels (dB), signal 402 may be represented in other units as well, such as Watts (W) for example. In various embodiments, signal 402 may be integrated over time to produce an energy signal in units of joules (J) or the like. In various embodiments, the units of a signal, as described herein, may be represented in normalized units, or any other suitable units.

Signal 402 may comprise power level 405 at frequency 414. Signal 402 may comprise power level 407 at frequency 416. Signal 402 may comprise power level 409 at frequency 418. Power level 405 and power level 407 may represents spikes in signal 402. Frequency 414 may be less than frequency 416. Thus, a time frequency analysis may be performed to calculate a power level over a range of frequencies. Plot 400 may illustrate the output of a time frequency analysis of signal 302 (see FIG. 3) at a first time (t). A time frequency analysis of signal 302 may be performed at a later time. In various embodiments, a time frequency analysis of signal 302 may be performed at a continuous, pre-determined rate. In various embodiments, frequency 414, frequency 416, and/or frequency 418 may be a pre-determined frequency.

With reference to FIG. 4B, a plot 410 of power in units of decibels (dB) versus frequency in hertz (Hz) is illustrated, in accordance with various embodiments. Signal 412 may represent a signal produced by signal 302 (see FIG. 3) via a time frequency analysis. Signal 412 may represent the output of a time frequency analysis of signal 302 (see FIG. 3) at a second time (t+T).

In various embodiments, signal 412 may comprise power level 415 at frequency 414. Signal 412 may comprise power level 417 at frequency 416. Signal 412 may comprise power level 419 at frequency 418. Power level 419 may represent a spike in signal 412. Thus, plot 410 illustrates a power level shift from a lower frequency, as illustrated in FIG. 4A, to a higher frequency, as illustrated in FIG. 4B. In various embodiments, a power level shift from a lower frequency to a higher frequency may be indicative of a susceptibility to a flutter condition. In various embodiments, a power level shift from a lower frequency to a higher frequency may be indicative of a flutter condition. Signal 412 may be monitored by a controller, such as controller 194 (see FIG. 1). Controller 194 may output an indicating signal based on the power level. For example, a controller may output an indicating signal indicating that a fan is susceptible to a flutter condition in response to power level shift from a lower frequency to a higher frequency. In various embodiments, an indicating signal may comprise a Boolean operator, a discrete value, text, or any other suitable signal. In various embodiments, a low frequency may be a frequency in the range of one hertz to five hundred hertz (1 Hz-500 Hz). In various embodiments, a high frequency may be a frequency in the range of five hundred hertz to one hundred thousand hertz (0.5 kHz-100 kHz).

In various embodiments, a threshold value may be used to determine a flutter condition. For example, if power level 419 at frequency 418 exceeds the threshold value, then it may be determined that a flutter condition may be present or susceptible to being present. In various embodiments, the threshold value may be a pre-determined threshold value.

Figure 5B:
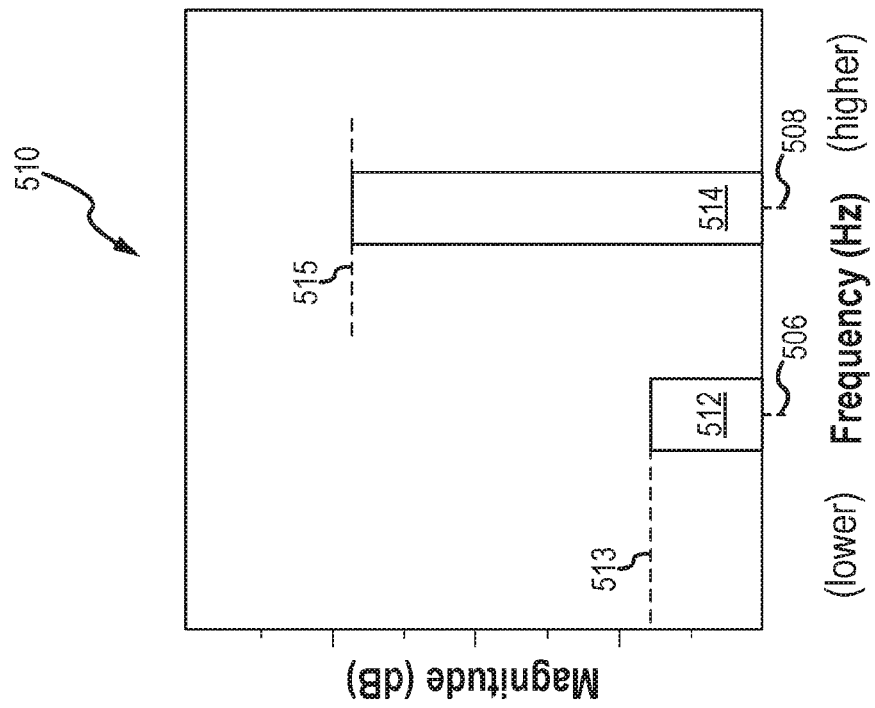
FIG. 5B illustrates a plot of a first bandpass signal and a second bandpass signal with a shift in a magnitude of a power level from the first bandpass signal to the second bandpass signal as compared to FIG. 5A, in accordance with various embodiments.
Figure 5A:
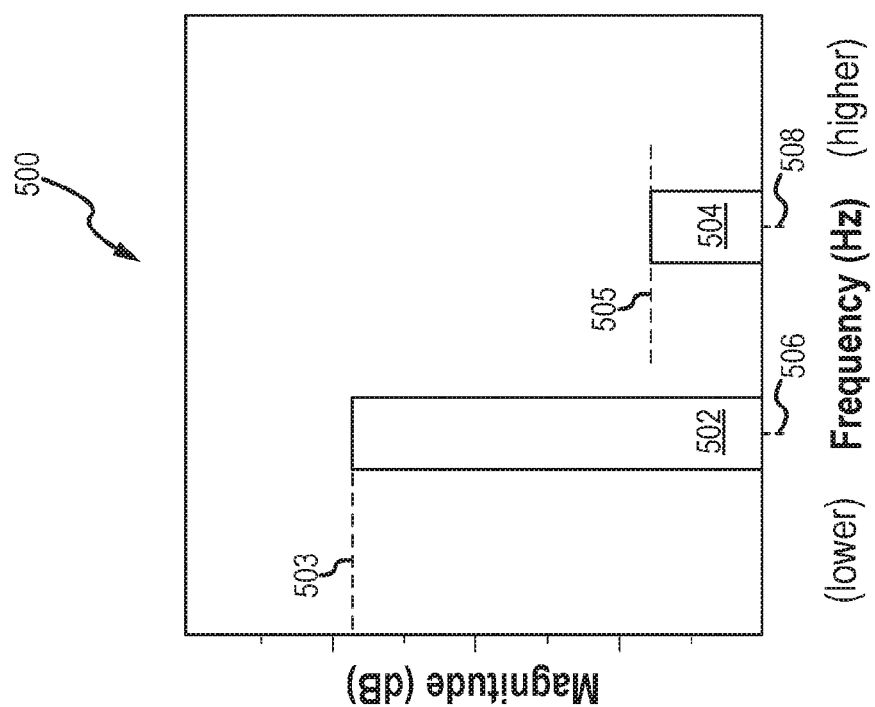
FIG. 5A illustrates a plot of a first bandpass signal and a second bandpass signal, in accordance with various embodiments.

With reference to FIG. 5A, plot 500 of a first bandpass signal 502 and a second bandpass signal 504 is illustrated, in accordance with various embodiments. Plot 500 may include bandpass signal (also referred to herein as a first bandpass signal) 502 and bandpass signal (also referred to herein as a second bandpass signal) 504. In various embodiments, bandpass signal 502 may be calculated by performing a time frequency analysis on signal 302 (see FIG. 3) and then integrating the resulting signal over a pre-determined range of frequencies. In various embodiments, bandpass signal 502 may be calculated by filtering signal 302 and then performing a time frequency analysis on the resulting filtered signal. Such filtering may include using a low pass filter, a high pass filter, a bandpass filter, or the like.

In various embodiments, bandpass signal 502 may comprise a power level (also referred to herein as a first power level) 503 at a frequency 506. In various embodiments, bandpass signal 504 may comprise a power level (also referred to herein as a second power level) 505 at a frequency 508. Frequency 508 may be greater than frequency 506. In various embodiments, frequency 506 and/or frequency 508 may be a pre-determined frequency.

Similar to FIG. 4A, plot 500 may illustrate the output of a time frequency analysis of signal 302 (see FIG. 3) at a first time (t). A time frequency analysis of signal 302 may be performed at a later time. In various embodiments, a time frequency analysis of signal 302 may be performed at a continuous, pre-determined rate.

With reference to FIG. 5B, plot 500 of a bandpass signal (also referred to herein as a first bandpass signal) 512 and a bandpass signal (also referred to herein as a second bandpass signal) 514 is illustrated, in accordance with various embodiments. Bandpass signal 512 and bandpass signal 514 may represent a signal produced by signal 302 (see FIG. 3) via a time frequency analysis. Bandpass signal 512 and a bandpass signal 514 may represent the output of a time frequency analysis of signal 302 (see FIG. 3) at a second time (t+T).

In various embodiments, bandpass signal 512 may comprise a power level (also referred to herein as a first power level) 513 at a frequency 506. In various embodiments, bandpass signal 514 may comprise a power level (also referred to herein as a second power level) 515 at a frequency 508.

With reference to FIG. 5A and FIG. 5B power level 513 may be less than power level 503. In various embodiments, power level 515 may be greater than power level 505. A change in the magnitude of power level 503 as illustrated in FIG. 5A to the magnitude of power level 513 as illustrated in FIG. 5B may be determined. For example, the magnitude of power level 503 in FIG. 5A is greater than the magnitude of power level 513 in FIG. 5B. A change in the magnitude of power level 505 as illustrated in FIG. 5A to the magnitude of power level 515 as illustrated in FIG. 5B may be determined. For example, the magnitude of power level 505 in FIG. 5A is less than the magnitude of power level 515 in FIG. 5B. Thus, a shift in power level from frequency 506 to frequency 508 may be determined as illustrated in FIG. 5A and FIG. 5B.

Figure 6:
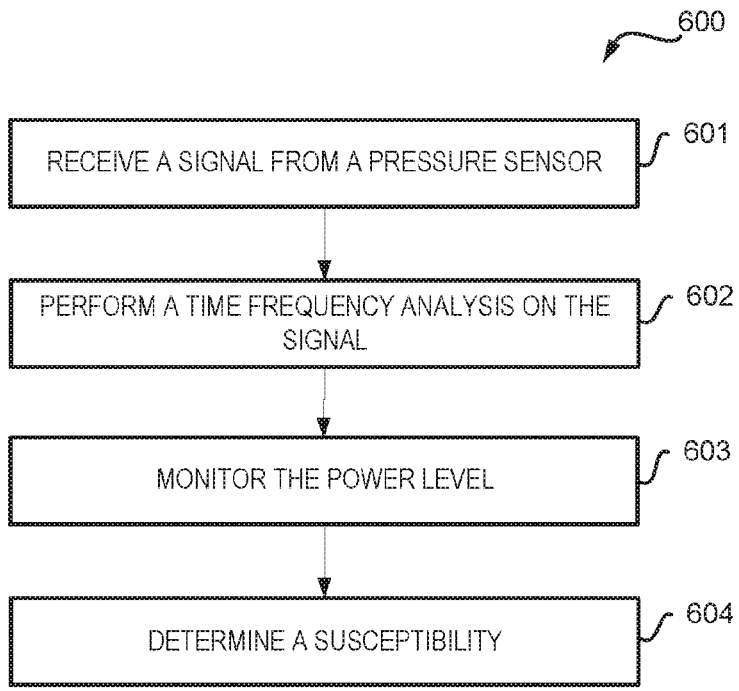
FIG. 6 illustrates a method for monitoring an aerostructure, in accordance with various embodiments.

With reference to FIG. 6, a method 600 for monitoring an aerostructure is illustrated, in accordance with various embodiments. Method 600 may include receiving a signal from a pressure sensor, in step 601. Method 600 may include performing a time frequency analysis on the signal, in step 602. Method 600 may include monitoring the power level, in step 603. Method 600 may include determining a susceptibility, in step 604.

With further reference to FIG. 1, FIG. 3, FIG. 4A, and FIG. 4B, step 601 may include receiving a signal 302 from a pressure sensor 192, the pressure sensor 192 located downstream from the aerostructure (i.e., fan 114). Step 602 may include performing a time frequency analysis on the signal 302 to calculate a power level (i.e., power level 405, power level 407, power level 409, power level 415, power level 417, and/or power level 419) over a range of frequencies (i.e., frequency 414, frequency 416, and/or frequency 418). Step 603 may include monitoring the power level over the range of frequencies. Step 604 may include determining a susceptibility to a flutter condition based on the monitoring the power level.

Figure 7A:
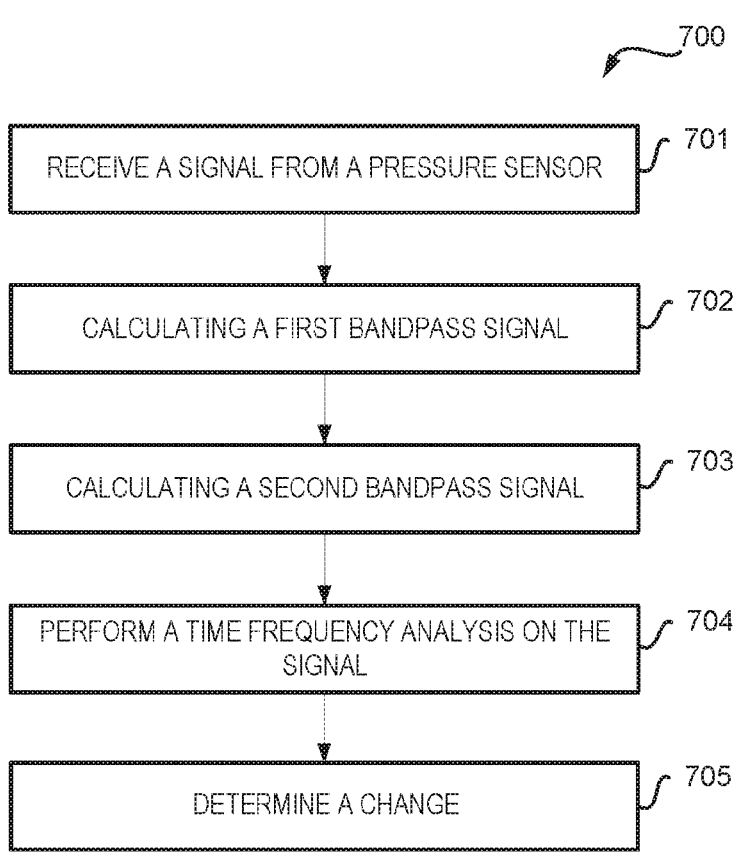
FIG. 7A illustrates a method for monitoring an aerostructure, in accordance with various embodiments.

With reference to FIG. 7A, a method 700 for monitoring an aerostructure is illustrated, in accordance with various embodiments. Method 700 may include receiving a signal from a pressure sensor, in step 701. Method 700 may include calculating a first bandpass signal, in step 702. Method 700 may include calculating a second bandpass signal, in step 703. Method 700 may include performing a time frequency analysis on the signal, in step 704. Method 700 may include determining a change, in step 705.

With further reference to FIG. 1, FIG. 3, FIG. 4A, and FIG. 4B, step 701 may include receiving a signal 302 from a pressure sensor 192, the pressure sensor 192 located downstream from the aerostructure (i.e., fan 114). Step 702 may include calculating a first bandpass signal (i.e., first bandpass signal 502, and/or first bandpass signal 512) based on the signal 302. Step 703 may include calculating a second bandpass signal (i.e., second bandpass signal 504, and/or second bandpass signal 514) based on the signal 302. Step 704 may include performing a time frequency analysis on the first bandpass signal and the second bandpass signal to calculate a power level (i.e., power level 503 and/or power level 513) of the first bandpass signal and a second power level (i.e., power level 505 and/or power level 515). Step 705 may include determining a change in at least one of a magnitude of the first power level and a magnitude of the second power level.

Figure 7B:
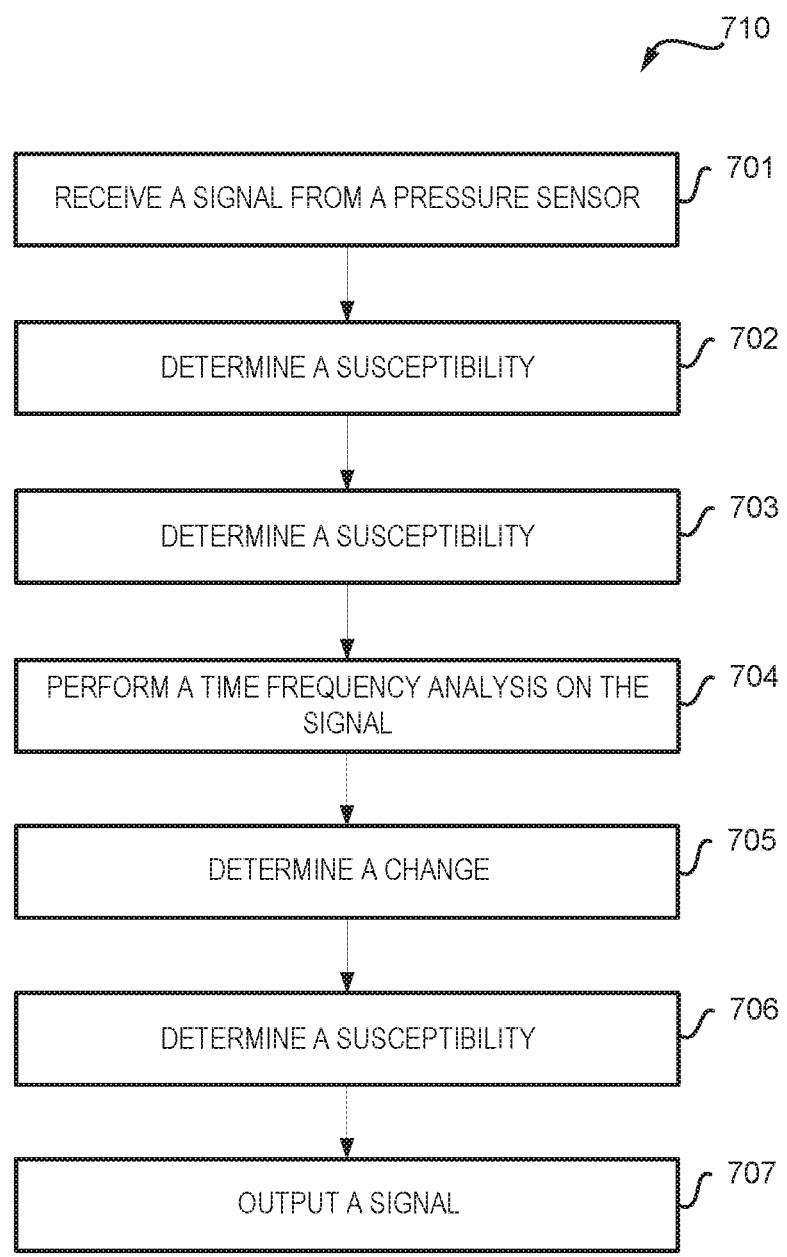
FIG. 7B illustrates a method for monitoring an aerostructure, in accordance with various embodiments.

With reference to FIG. 7B, a method 710 for monitoring an aerostructure is illustrated, in accordance with various embodiments. Method 710 may be similar to method 700 of FIG. 7A with the addition of step 706 and step 707. Method 710 may include determining a susceptibility, in step 706. Step 706 may be similar to step 604 (see FIG. 6). Method 710 may include outputting an indicating signal, in step 707. Step 707 may include outputting an indicating signal based on the power level. For example, controller 194 may output an indicating signal based on the power level indicating that a fan is susceptible to a flutter condition in response to power level shift from a lower frequency to a higher frequency.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for monitoring fan blades for a gas turbine engine comprising:
   receiving, by a controller, a signal from a pressure sensor, the pressure sensor located downstream from the fan blades;
   performing, by the controller, a time frequency analysis on the signal to calculate a power level over a range of frequencies of the signal;
   monitoring, by the controller, the power level over the range of frequencies;
   determining a shift in the power level from a lower frequency to a higher frequency; and
   determining, by the controller, a susceptibility to a flutter condition based on the shift in the power level.

2. The method of claim 1, wherein the pressure sensor is capable of measuring a dynamic frequency with a Nyquist frequency greater than at least a third fundamental frequency of the fan blades.

3. The method of claim 1, wherein the performing the time frequency analysis includes at least one of performing a Fourier transform, a wavelet transform, a bilinear time frequency distribution, or a modified Wigner distribution function.

4. The method of claim 1, wherein the monitoring the power level includes calculating a change in the power level over the range of frequencies.

5. The method of claim 4, wherein the monitoring the power level includes calculating the change in the power level at a pre-determined frequency.

6. The method of claim 1, wherein the determining the susceptibility to the flutter condition is based on the power level over the range of frequencies.

7. The method of claim 6, wherein the determining the susceptibility to the flutter condition includes determining if the power level is above a threshold value.

8. The method of claim 6, wherein the determining the susceptibility to the flutter condition includes determining a shift in the power level from a lower frequency to a higher frequency.

9. A method for monitoring fan blades for a gas turbine engine, comprising:
   receiving, by a controller, a signal from a pressure sensor, the pressure sensor located downstream from the fan blades;
   calculating, by the controller, a first bandpass signal based on the signal;
   calculating, by the controller, a second bandpass signal based on the signal, the second bandpass signal comprising a higher frequency than the first bandpass signal;
   performing, by the controller, a time frequency analysis on the first bandpass signal and the second bandpass signal to calculate a first power level of the first bandpass signal and a second power level of the second bandpass signal; and
   determining, by the controller, a change in at least one of a magnitude of the first power level and a magnitude of the second power level.

10. The method of claim 9, further comprising, determining, by the controller, a susceptibility to a flutter condition based on at least one of the first power level and the second power level.

11. The method of claim 10, further comprising, outputting, by the controller, an indicating signal based on the determining the susceptibility, the indicating signal indicating the susceptibility.

12. The method of claim 9, wherein the pressure sensor is capable of measuring a dynamic frequency with a Nyquist frequency greater than at least a third fundamental frequency of the fan blades.

13. The method of claim 9, wherein the performing the time frequency analysis includes at least one of performing a Fourier transform, a wavelet transform, a bilinear time frequency distribution, or a modified Wigner distribution function.

14. The method of claim 9, wherein the determining the change includes determining a shift in the magnitude of the first power level to the magnitude of the second power level.

15. A system for monitoring fan blades for a gas turbine engine, comprising:
   a pressure sensor configured to be located downstream from the fan blades;
   a controller in electronic communication with the pressure sensor; and
   a tangible, non-transitory memory configured to communicate with the controller, the tangible, non-transitory memory having instructions stored thereon that, in response to execution by the controller, cause the controller to perform operations comprising:
     receiving, by the controller, a signal from the pressure sensor;
     performing, by the controller, a time frequency analysis on the signal to calculate a power level over a range of frequencies of the signal;
     monitoring, by the controller, the power level over the range of frequencies;
     determining a shift in the power level from a lower frequency to a higher frequency; and
     outputting an indicating signal based on the shift in the power level.

16. The system for monitoring fan blades of claim 15, wherein the indicating signal indicates a susceptibility to a flutter condition of the aerostructure.

17. The system for monitoring fan blades of claim 15, wherein the instructions cause the controller to perform operations further comprising:
   calculating a first bandpass signal based on the signal;

calculating a second bandpass signal based on the signal, the second bandpass signal comprising a higher frequency than the first bandpass signal;

performing the time frequency analysis on the first bandpass signal and the second bandpass signal to calculate a first power level of the first bandpass signal and a second power level of the second bandpass signal; and determining a change in at least one of a magnitude of the first power level and a magnitude of the second power level.

18. The system for monitoring fan blades of claim 15, wherein the pressure sensor is capable of measuring a dynamic frequency with a Nyquist frequency greater than at least a third fundamental frequency of the aerostructure.

19. The system for monitoring fan blades of claim 18, wherein the pressure sensor is configured to be coupled to at least one of an inner fixed structure or a fan case.

* * * * *